United States Patent [19]
Gloge

[11] Patent Number: 4,563,774
[45] Date of Patent: Jan. 7, 1986

[54] ADDRESS CODED COMMUNICATION SYSTEM

[75] Inventor: Detlef C. Gloge, Colts Neck, N.J.

[73] Assignee: AT&T Bell Laboratories, Murray Hill, N.J.

[21] Appl. No.: 436,576

[22] Filed: Oct. 25, 1982

[51] Int. Cl.⁴ .......................... H04J 1/16; H04B 9/00
[52] U.S. Cl. .................................... 455/607; 455/617;
455/608; 340/146.2; 340/825.5; 370/85;
370/94; 370/89; 375/1
[58] Field of Search ............... 455/601, 606, 607, 608,
455/612, 617, 38, 49; 364/728, 900, 200;
340/146.2, 825.5, 825.52; 370/89, 94, 85, 94 U;
375/1

[56] References Cited

U.S. PATENT DOCUMENTS

| | | | |
|---|---|---|---|
| 3,598,979 | 8/1971 | Moreau | 340/146.2 |
| 4,027,153 | 5/1977 | Käch | 455/607 |
| 4,027,283 | 5/1977 | Tang | 371/47 |
| 4,038,644 | 7/1977 | Duke et al. | 364/900 |
| 4,063,083 | 12/1977 | Cathey et al. | 455/607 |

FOREIGN PATENT DOCUMENTS 0048047  3/1982  European Pat. Off. ............ 455/612

OTHER PUBLICATIONS

"Spread-Spectrum Multiple Access Data Loop", by Botaro Hirosaki, Satoshi Hasegawa and Akira Sawai, *IEEE National Telecommunications Conference*, Nov. 1981, pp. G8.5.1–G8.5.6.

J. J. O'Reilly, "An Optical Technique for Generating Very High Bit-Rate M-Sequences", Sep. 1975, pp. 425–427.

M. M. Mano, *Computer System Architecture*, 1982, pp. 418–420.

*Primary Examiner*—Joseph A. Orsino, Jr.
*Assistant Examiner*—Timothy K. Greer

[57] ABSTRACT

In the disclosed communication system the digital message bits (e.g., data bits) to be transmitted to a particular receiver are individually encoded in the digital address (of K bits) of that receiver. The receiver has a K(stage) correlation circuit which serves to correlate all incoming message information with its own digital address. In the case of a match, autocorrelation peaks appear at intervals determined by the digital message. A feature is to transmit each address sequence a number of times (e.g., 8) so as to reduce the likelihood of error.

7 Claims, 4 Drawing Figures

ADDRESS CODED COMMUNICATION SYSTEM

TECHNICAL FIELD

The present invention relates to communication systems and, more particularly, to an address coded distribution system which utilizes a spread spectrum multiple access (SSMA) technique.

BACKGROUND OF THE INVENTION

Conventional digital communication of baseband data and speech signals uses synchronous time slots and frames such that recurring time slots in each frame are used for successive data bits or speech samples. Framing and synchronization, however, create a substantial hardware overhead and complicate operation—particularly when remote access is desirable.

Spread spectrum techniques for communication purposes are of ever increasing importance and research in this area is being actively pursued by many. The paper by B. Hirosaki et al entitled "Spread-Spectrum Multiple Access Data Loop," *IEEE National Telecommunications Conference*, November 1981, pp. G8.5.1–G8.5.6, discloses an optical fiber, spread spectrum, loop communication system for data, and analog signals. This system comprises a multiple of transmit/receive local nodes connected in a loop configuration, and a sync node which transmits a sync signal over the loop to establish frame synchronization at each local node. The performance/reliability of this loop or ring configuration requires the repeat-and-transmit involvement of all nodes.

SUMMARY OF THE INVENTION

It is an object of the present invention to provide a communication network that needs no synchronization circuits, whose access ports are independent of each other, and where analog and digital access ports can be mixed in the same network.

A further object of the invention is to avoid the repeat-and-transmit involvement noted above.

The approach of the present invention uses address coding of individual baseband data bits (or speech sample bits) enabling a receiver to recognize its (address) message in the background of other and different (address) encoded messages. The message samples are appropriately distributed or switched independently from one another; no format or framing is necessary; and queuing delays are absent.

It is a feature of the present invention that a programmable single-chip integrated circuit can perform the (address) detection process for any one of hundreds of addresses with an error rate better than $10^{-6}$.

In a communication system in accordance with a preferred embodiment of the invention, the digital message bits (e.g., data bits) to be transmitted to a particular receiver are individually encoded in the digital address (a maximum-length shift register sequence of K bits) of that receiver. The receiver has a (K-stage) correlation circuit which serves to correlate all incoming message information with its own digital address. In the case of a match, autocorrelation peaks appear at intervals determined by the digital message.

In accordance with a feature of the invention, each address sequence is transmitted a number of times (e.g., 8) so as to reduce the likelihood of an error.

BRIEF DESCRIPTION OF THE DRAWINGS

The invention will be more fully appreciated from the following detailed description when the same is considered in connection with the accompanying drawings, in which.

DETAILED DESCRIPTION

Figure 1:
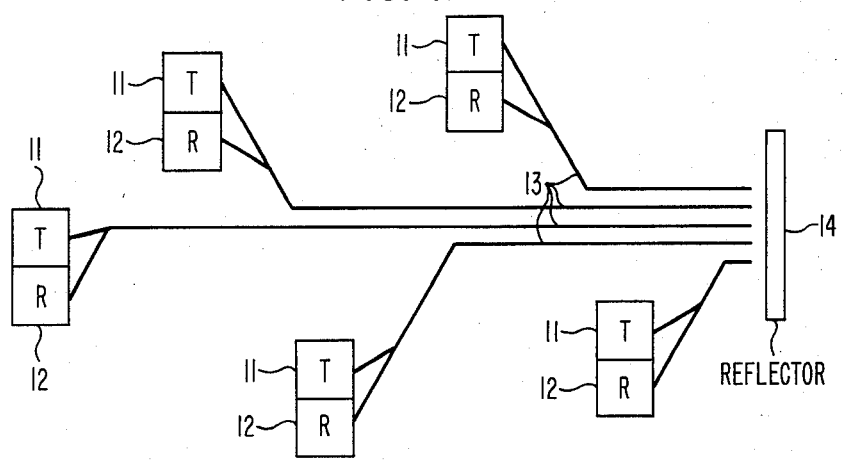
FIG. 1 is a block diagram of a communication network in accordance with the present invention.

An address selection code, generated at each transmitter, has 10 bits, k of which are used to generate an address sequence of $K=2^k$ bits. Assume for purposes of explanation that $k=7$. Therefore, a sequence of K bits comprises an address word of 128 bits which uniquely identifies one, and only one, receiver. The digital message bits to be transmitted are individually encoded in the K bit sequence that identifies the intended receiver. The receiver has a K-stage correlation circuit programmed to correlate all incoming message information with its own digital address. In the case of a match, autocorrelation peaks of magnitude K appear at intervals determined by the message. The correlator output also contains a background caused by the signals from M other transmitters. If "ones" and "zeros" are equally likely in all received sequences, a background peak of magnitude N will occur with probability (based on a Gaussian approximation of the binomial law) $(2\pi)^{-\frac{1}{2}} \exp(-N^2/2KM)$. The probability that a background peak exceeds an autocorrelation peak is therefore $$p = \text{erfc}[\sqrt{K/2M}] \qquad (1)$$

where erfc is the error function complement. Since there are $K-1$ background time slots, the word error probability becomes $p' = (K-1)p$ and the bit error probability is $$P = \frac{Kp'}{2(K-1)} = \frac{K}{2} \text{erfc}[\sqrt{K/2M}] \qquad (2)$$

To reduce the likelihood of an error, each address sequence is transmitted L times (e.g., $L=8$). The L sequences are shifted or delayed with respect to each other according to a pattern determined by the remaining 3 bits of the address selection code. The receiver reverses the delay pattern and synchronizes the L autocorrelation peaks. Decisions about the presence or absence of autocorrelation peaks are made in L parallel K-stage correlation circuits (e.g., of charge coupled devices). Only the coincidence of L peaks in the same time slot represent a message bit. In this case, the probability that an erroneous peak occurs in all L correlators at once is $p^L$ and the bit error probability becomes $$P_L = \frac{K}{2} \text{erfc}^L[\sqrt{K/2M}]. \qquad (3)$$

A programmable IC (integrated circuit) can be readily configured to operate with 8 parallel 128-stage correlators (charge coupled devices) at a rate of 1 Mb/s. In this configuration L=8 and k=7. If the maximum message bit repetition rate is equal to the voice sampling rate of 8 kb/s, the address sequences have a bit rate of 1.024 Mb/s. Let the required bit error rate $P_L=10^{-6}$ and solve (3) for M and we obtain M=49, where M is the number of other transmitters in the network.

An address sequence bit rate of 1.024 Mb/s translates into an 8 kb/s data transmission rate. These numbers, however, are given only by way of example; with an optical fiber transmission facility, significantly higher data transmission rates can be easily realized. Again, by way of example, 7-bit PCM encoded speech signals can be address encoded in accordance with the invention and the resultant address sequence will have a bit rate of 7.168 Mb/s which is still very much within the transmission capacity of a fiber optic link.

Turning now to FIG. 1 of the drawings, there is shown an optical fiber communication system which comprises a plurality of (data and/or digitalized speech) terminals in accordance with the invention. While the following description may speak of digital data and data terminals, it is to be understood that the principles of the present invention are equally applicable to the transmission of digitally encoded (e.g., PCM or DPCM) speech signals. Each terminal includes a transmitter 11 and a receiver 12. The transmission media comprises optical fibers 13 and the requisite transducers for the same (i.e., lasers or LEDs and photodiodes). The digital message from a given transmitter is transmitted over a dedicated optical fiber to a reflector 14, which reflects the message into each of the other fibers individually dedicated to each of the other terminals. The reflector 14 may comprise any one of the various reflection arrangements known to those in the art. As depicted in FIG. 1, a single bidirectional optical fiber can be provided for each terminal. However, the invention is not so constrained and a pair of unidirectional fibers (one for each direction of transmission) may be provided for each terminal. In either case, it will be apparent that the transmission to each terminal receiver 12 will include its intended message as well as a background caused by the message signals intended for other and different terminal receivers. A correlation circuit in each receiver serves to correlate all incoming (address) messages with its own digital address and when a match occurs autocorrelation peaks appear at intervals determined by the digital message. An output sequence of autocorrelation peaks is thus obtained which corresponds to the digital data input to the system.

Figure 2:
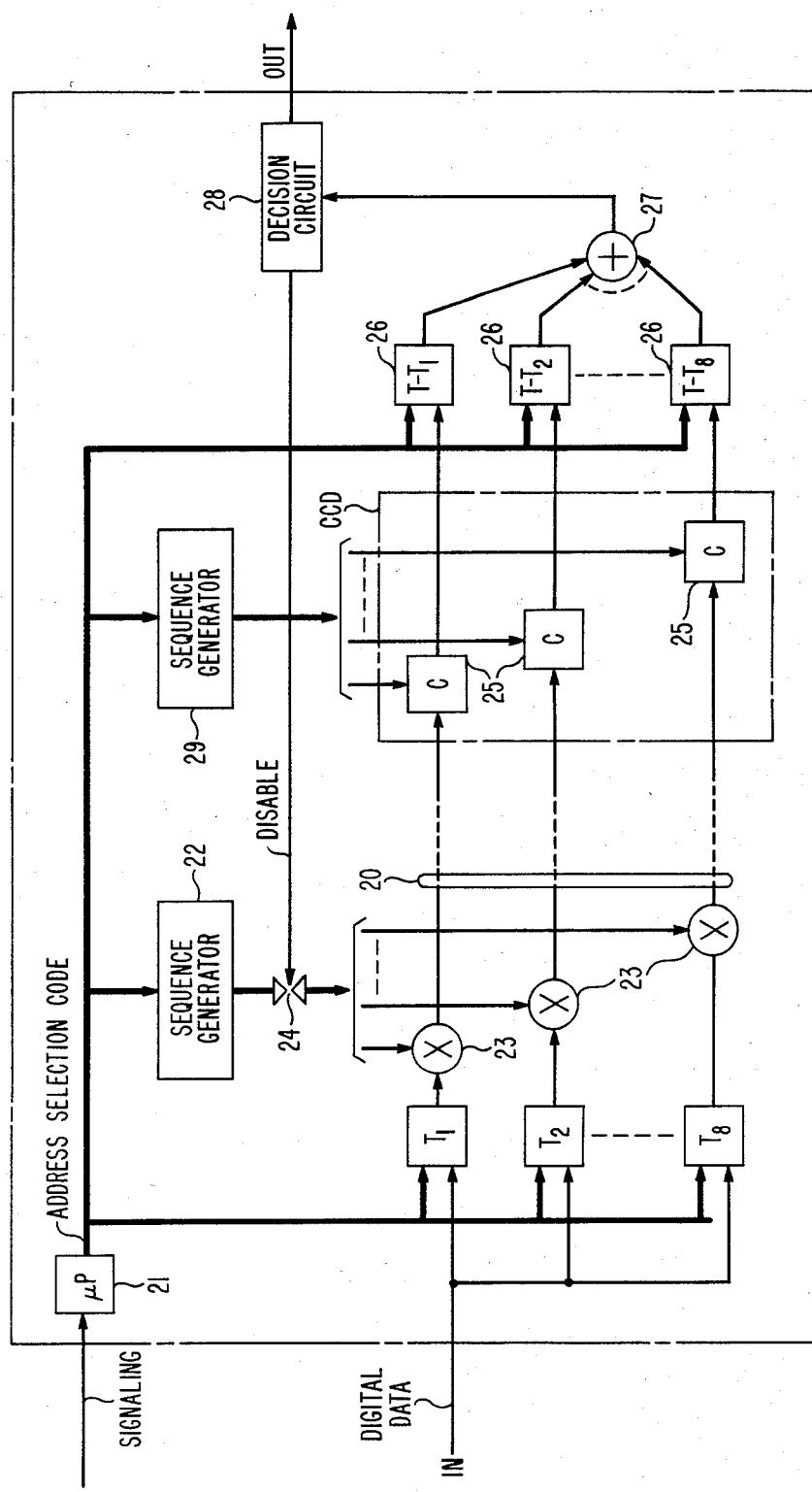
FIG. 2 is a schematic block diagram of the transmitter/receiver apparatus provided in accordance with the invention at each of the terminals of FIG. 1.

In the preferred embodiment of the invention shown in FIG. 2, an address coded message is transmitted a number of times (e.g., 8) to substantially reduce the likelihood of error. To this end, the input digital data is delivered to each of the eight delay units $T_1$ through $T_8$ of FIG. 2. As the name implies, each delay unit introduces a finite delay: $T_{1...8}=n_{1...8}$ time slots; $n_{1...8}=1...128$. That is, each delay ($T_1-T_8$) can be 1-128 time slots in duration. The amount of delay introduced in each case is determined by 3 bits of the address selection code generated by the microprocessor 21. The signaling information (e.g., TOUCH-TONE signals), indicating the message destination, is delivered to the microprocessor 21 which converts or translates the same into the appropriate address selection code of 10 bits. Seven of these 10 bits are delivered to the sequence generator 22 which, in response thereto, generates the appropriate address sequence K. And the remaining 3 bits of the address selection code are used to set delays $T_1-T_8$. Since there are eight different delays, three address selection bits are required. There are numerous arrangements known in the art (e.g., multi-tapped delay lines) for providing the delays $T_1-T_8$.

The sequence generator 22 serves to generate an address sequence K of 128 bits ($K=2^k$ and $k=7$). And this generated sequence uniquely identifies one, and only one, receiver. Each receiver, of course, has its own unique address sequence. The sequence generator 22 may comprise a conventional pseudo-random sequence generator consisting of a 7-bit shift register having modulo-2 adders in the feedback path. As is known to those in the art, different pseudo-random sequences are generated by tapping different register cells and/or connecting different modulo-2 adders into the feedback path. The assignment of a particular pseudo-random sequence to a given terminal in the network can be completely arbitrary. All that is necessary in this regard is that different terminal receivers be responsive to different sequences.

The serial K-bit sequence from generator 22 is delivered to each of the multipliers 23 via the electronic switch 24, to be described hereinafter. The delayed data bits are also coupled to these multipliers. The signals coupled to each multiplier are multiplied together so that for every binary one ("1") data bit a K-bit sequence is provided at each multiplier output and is then transmitted to the intended receiver over a respective optical fiber 20. The binary zero ("0") data bits are not address encoded as described; that is, they are not transmitted. The signal in each optical fiber 20 is reflected into a predetermined one, and only one, optical fiber associated with each receiver. That is, each of the eight address encoded messages from the eight multipliers 23 is respectively directed (by reflection) into a predetermined one, and only one, of the eight separate and distinct optical fibers associated with each receiver. This is readily accomplished using an equivalent number of reflectors.

At the intended receiver, the optical signals in fibers 20 are converted to electrical signals, which are delivered to the eight correlator circuits 25. In addition to the desired address encoded message, the background (noise) caused by the signals from the other transmitters will also be coupled to the correlators 25. However, since the autocorrelation peaks exceed background peaks, the desired signal can be recovered.

Figure 3:
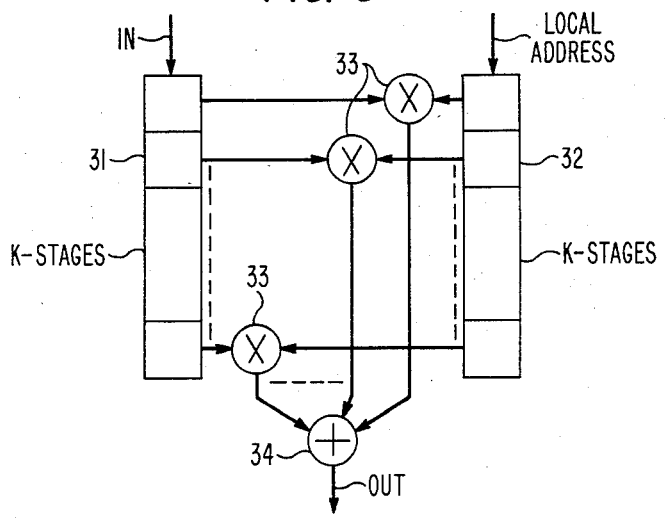
FIG. 3 is a schematic block diagram of the correlators(c) shown in FIG. 2.

FIG. 3 shows a simplified schematic block diagram of the correlators 25. The received address encoded message is read into the K-stage (K=128) register 31. The local K-bit address word (of 128 bits) is stored in register 32; the local address is always stored in register 32 except for a short period at call set-up time—as will be described hereinafter. The signals stored in the corresponding stages of the registers 31 and 32 are multiplied together in multipliers 33, and the output of multipliers 33 are added in adder 34. When the K-bit address message stored in register 31 matches the K-bit local address stored in register 32 an autocorrelation peak is obtained at the output of adder 34. CCD correlators are known in the art; see the article entitled "Analog-Binary CCD Correlator: A VLSI Signal Processor" by D. A. Gandolfo et al, *IEEE Journal of Solid State Circuits*, Vol. SC-14, No. 2, April 1979, pps. 518-525.

The (autocorrelation peak) output of each correlator 25 is delivered to a delay unit 26 as shown in FIG. 2. These delay units complement (or reverse) the delay pattern introduced at the transmitter by delay units $T_1$-$T_8$ so that the autocorrelation peaks from the delay units 26 are in sync with each other.

The synchronized autocorrelation peaks from the delay units 26 are added together in adder 27 and the result delivered to the decision circuit 28. The decision circuit establishes a threshold that will be exceeded by the summed autocorrelation peaks from adder 27 but not by background peaks. The output of the decision circuit comprises a sequence of autocorrelation peaks which corresponds to the digital data message, and is readily converted thereto.

A programmable integrated circuit comprised of charge-coupled devices (CCDs) can be used to provide the plural correlation function. In addition, the delay devices may comprise part of the CCD integrated circuits.

Normally, the sequence generator 29 generates the K-bit address that is unique to its terminal. The delays $(T-T_1)$ through $(T-T_8)$ are also unique to a given terminal receiver. However, at call set-up time the K-bit sequence from generator 29 and the delays 26 are changed, temporarily, to avoid data "collision". The latter condition occurs when two or more transmitters are attempting to send a message to the same receiver. Such a condition can occur in spread spectrum multiple access systems and must be avoided.

When the local transmitter of a given terminal is to send a message to a remote receiver, the local receiver is configured to match the remote receiver. That is, the sequence generator 29 of the local receiver is changed, under microprocessor control, so as to provide the K-bit address sequence of the remote receiver. The delays 26 are also changed to match the delays of the remote receiver. Accordingly, since the local receiver temporarily appears as a duplicate of the remote receiver, it will detect if the remote receiver is presently "busy", i.e., it is receiving a message. If a busy condition is detected at the local receiver, an autocorrelation peak from decision circuit 28 is used to disable the local transmitter by means of electronic switch 24. The disabled switch prevents the transmission of the K-bit address sequence of the remote receiver from generator 22 to multipliers 23. An audible or visual busy signal can also be provided.

Figure 4:
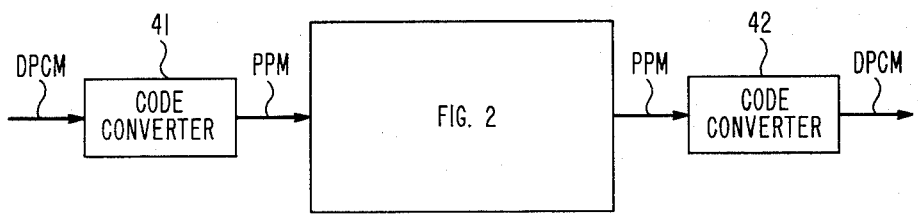
FIG. 4 shows a modification of the FIG. 2 apparatus for a DPCM input.

The bits of a digitally encoded (e.g., PCM or DPCM) speech signal can be address encoded in the same manner described above. However, to save bandwidth a DPCM signal, for example, can be converted to a PPM (pulse position modulation) signal prior to the described address encoding, as shown in FIG. 4. This has the effect of reducing the bandwidth required. For example, instead of transmitting a 3-bit DPCM signal, it can first be converted to a PPM signal. The period or time slots between successive PPM signals is the direct analogue of successive DPCM signals. At the receiver terminal the PPM signal is converted back to DPCM. The code converters 41 and 42 of FIG. 4 can comprise any of the state of the art code conversion circuits.

As shown in FIG. 2, the address sequence is transmitted 8 times (L=8) to reduce the likelihood of error. However, the number eight was chosen only for descriptive purposes and L might just as readily be 2, 3, 4 ... 10, 12 .... Further, rather than transmit L address sequences over an equivalent number of optical fibers, the L sequences could be transmitted in time division multiplexed fashion over a common optical fiber.

The invention should not be construed as particularly limited to the network configuration shown in FIG. 1, and any other suitable network configuration known in the art might be used. Further, the described transmission facility comprises optical fibers, but other transmission facilities (e.g., coaxial cable) might be advantageously used for transmission purposes. It is to be understood therefore that the foregoing disclosure relates to only a preferred embodiment of the invention and that numerous modifications or alterations may be made therein without departing from the spirit and scope of the invention.

What is claimed is:

1. A digital communication system comprising a plurality of terminals, each terminal having a transmitter (11) and a receiver (12), guided transmission means (13, 14) for transmitting a digital message from each and every transmitter to each and every receiver, means at each receiver for generating for and thereby identifying each receiver by a different and unique digital word address, means (22, 23) at each transmitter for individually encoding each of the digital message bits to be transmitted to a particular receiver in the digital word address of that receiver, each address encoded message bit sequence being transmitted to said receiver a predetermined number of times, a plurality of correlator means (25) at each receiver each of which serves to correlate the incoming message information directed thereto with the receiver's digital address, each correlator means producing an autocorrelation peak when a received address encoded message bit matches the receiver's digital address, means (27) for summing the autocorrelation peaks from each of the correlator means, a means (26, 29) for reconfiguring a local receiver to match a given remote receiver prior to transmission to the latter from the local transmitter, the reconfigured local receiver serving to detect if the remote receiver is busy, and means (24) for inhibiting the transmission from the local transmitter if a busy condition is detected.

2. A digital communication system as defined in claim 1 wherein said transmission means comprises a predetermined number of optical fibers associated with the transmitter and the receiver of each terminal, each of said predetermined number of address encoded sequences being coupled to a respective optical fiber.

3. A digital communication system as defined in claim 2 including means ($T_1$-$T_8$) for delaying the predetermined number of address encoded sequences in accordance with a selected delay pattern prior to coupling the sequences to said otical fibers, and delay means (26) at said particular receiver for reversing the delay pattern introduced at the transmitter so that the autocorrelation peaks from the correlator means are in synchronism.

4. A digital communication system as defined in claim 3 wherein the delay means of each receiver has a unique delay pattern, the delay pattern introduced at each transmitter being the complement of the delay pattern of the intended receiver.

5. A digital communication system as defined in claim 2 wherein the number of optical fibers is eight.

6. A digital communication system as defined in cla͏ 4 including decision means (28) coupled to receiv sum of the autocorrelation peaks from the s͏ means, said decision means serving to establi͏ old which is exceeded by the summed autocorrelation peaks but not normally by background peaks.

7. A spread spectrum multiple access communication system comprising

- a plurality of terminals, each terminal having a transmitter (11) and a receiver (12),
- guided transmission means (13, 14) for transmitting a digital data message from each and every transmitter to each and every receiver,
- means (29) for generating a unique digital word address for each receiver,
- means (22) at each transmitter for generating the unique digital word address of the receiver for which said digital data message is intended,
- each transmitter having a plurality of delay devices ($T_1$-$T_8$) each of which provides a predetermined amount of delay,
- means for coupling the bits of said digital data message to each of said delay devices,
- a plurality of multiplier means (23) for respectively address encoding the message bits by multiplying each of the delayed message bits with the unique digital word address of the intended receiver so that each address encoded message bit is transmitted to said receiver a predetermined number of times,
- a plurality of correlator means (25) at each receiver each of which serves to correlate the incoming message information directed thereto with the unique digital word address generated for the receiver,
- each correlator means producing an autocorrelation peak when a received address encoded message bit matches the unique digital word address of the receiver,
- a plurality of delay devices (26) respectively coupled to said plurality of correlator means for respectively delaying each autocorrelation peak a predetermined amount to thereby reverse the delay pattern introduced at the transmitter and bring the autocorrelation peaks from said correlator means into time coincidence,
- means (27) for summing the delayed autocorrelation peaks,
- means (26, 29) for reconfiguring a local receiver to match a given remote receiver prior to a transmission thereto by adopting for said local receiver the unique digital word address and the predetermined amounts of delay of the remote receiver,
- the reconfigured local receiver serving to detect if the remote receiver is busy, and
- means (24) for inhibiting the transmission from the local transmitter to said remote receiver if a busy condition is detected.

* * * * *